May 4, 1948. E. DODSON 2,441,012
FUEL SUPPLY SYSTEM FOR AIRCRAFT ENGINES
Filed Aug. 23, 1944 2 Sheets-Sheet 1

Inventor
Edward Dodson
By Moses, Nolte, Crews + Berry
Attorneys

Patented May 4, 1948

2,441,012

UNITED STATES PATENT OFFICE 2,441,012

FUEL SUPPLY SYSTEM FOR AIRCRAFT ENGINES

Edward Dodson, Oaks, Puriton, near Bridgwater, England

Application August 23, 1944, Serial No. 550,831
In Great Britain September 23, 1943

6 Claims. (Cl. 123—119)

This invention provides a fuel supply system for an aircraft engine, comprising a servo mechanism responsive to boost pressure and arranged to vary the fuel/air ratio so as to give an economical mixture at cruising boosts and a richer mixture for power when the boost exceeds a given value, and a separate mechanism operated direct from the pilot's throttle lever for enriching the mixture whenever said lever is moved beyond the cruising range.

The pilot's throttle lever is associated in known manner with a variable datum boost control device which, as described in U. S. Patent No. 1,995,800, maintains in the induction system of the engine a selected boost pressure determined by the position of said lever, the selected boost pressure increasing as the lever moves from the slow running to the full throttle position.

For intermediate positions of the pilot's throttle lever, defining what is known as the cruising range, at which the engine develops a moderate degree of power only, a weak mixture is desirable for reasons of economy. On movement of the pilot's lever beyond the upper limit of the cruising range and towards the full throttle position a richer mixture is however needed. This enrichment of mixture is effected, in installations according to the invention, by the conjoint action of the above mentioned servo mechanism responsive to boost pressure and of the other mechanism operated directly by the pilot's throttle lever.

The servo mechanism will, in fuel supply systems according to the invention, usually operate a cam whose contour is such that up to a specific boost pressure the mixture strength will be that giving economy, but entailing some power loss, this weak mixture persisting until the boost pressure becomes too high for the engine to suffer without damage, this condition being known as maximum weak cruising. From this condition onwards, as the boost pressure increases the mixture will be enrichened by the cam until, for instance, at the maximum boost pressure allowed for take off conditions the mixture strength may be 50% richer than would be the case if the economical mixture were allowed to persist up to take off boost.

At some height above rated height the supercharger is unable to maintain a boost pressure higher than that just safe for economical cruising, and therefore the engine throttle will be maintained wide open by the boost control, but the power available will not be the utmost the engine is capable of safely delivering at that boost pressure. It is, therefore, according to this invention, proposed to utilise another cam or the like operated directly by the pilot which will cause, whenever the pilot places his operating lever in the full throttle position, such an increase in the mixture strength as is required to give the maximum power. In many cases this will be of the order of 15%. To obtain the before-mentioned 50% increase for take off conditions, given by way of example, the cam operated by the servo mechanism will be designed to cause a 35% enrichment only of the mixture, and thus the 15% added to it by the cam operated directly by the pilot will make up the required enrichment for take off conditions. It would not be suitable to provide the entire 50% enrichment by a cam directly operated by the pilot, because when the boost pressure is lower than that for take off, the enrichment suitable to suppress detonation with the higher pressures would cause a loss of power at such lower pressures, and the loss would be very considerable if this great enrichment was applied at the relatively low pressure of maximum-permitted economical cruising pressure.

It will therefore be appreciated that the invention involves the use of two enrichment means, one controlled by the servo mechanism responsive to boost pressure and the other by direct operation of the pilot, these two means when added together being capable of providing a proper mixture strength to convert the weak economical cruising mixture to that required for maximum power under the boost pressures prevailing.

The invention accordingly includes a fuel supply system for an aircraft engine, comprising mixture control means for varying the fuel/air ratio, a servo mechanism responsive to boost pressure and operating on said mixture control means through the agency of a cam or the equivalent, shaped to provide an economical mixture at cruising boosts and a richer mixture when the boost exceeds a given value, and a second cam or the equivalent, operated by a direct mechanical connection from the pilot's throttle lever, and acting on the mixture control means to enrich the mixture whenever said lever is moved beyond the cruising range.

One form of fuel injection system according to the invention as applied to an aircraft engine fitted with an accelerator pump of the kind described in my copending application Serial No. 550,830, filed August 23, 1944, now Patent No. 2,416,797 will now be described in detail, by way of example, with reference to the accompanying drawings in which.

Like reference characters indicate like parts throughout the figures.

Figure 1:
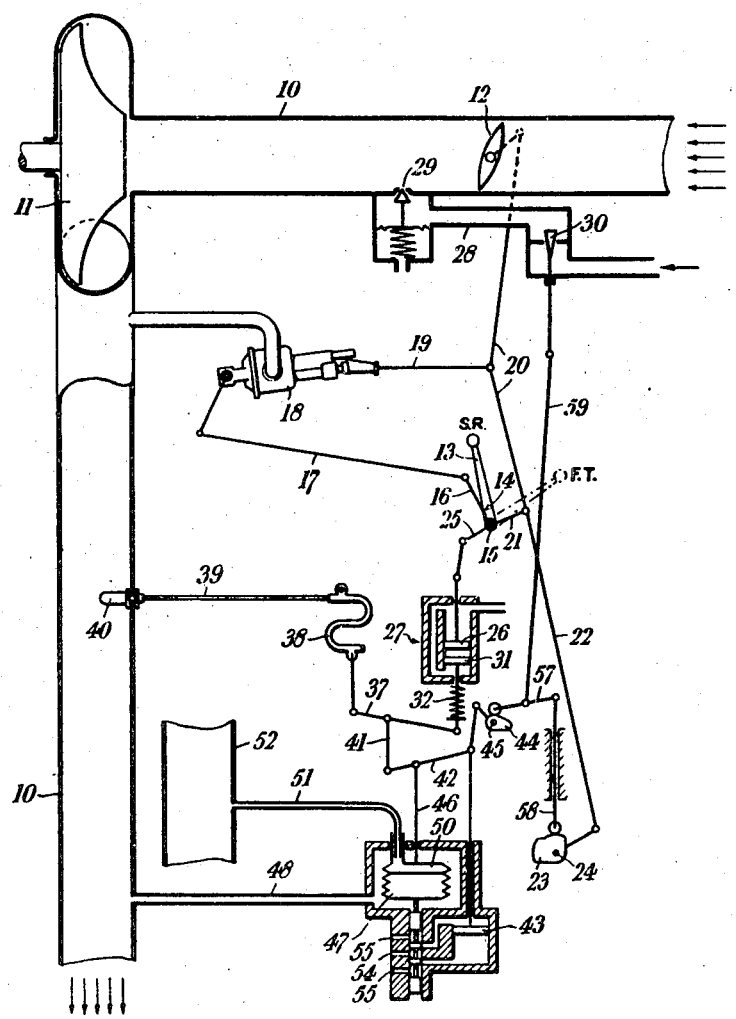
Fig. 1 is a diagrammatic showing of the complete installation.

Referring first of all to Fig. 1, air is fed to the engine along the induction pipe 10 by an engine-driven supercharger 11, the flow of air being controlled by a throttle valve 12.

To the pilot's throttle lever 13 is fixed a three-armed lever 14 rotatable about a pivot 15. The arm 16 of the lever 14 is connected, by a link 17, to the controlling cam of a variable datum boost control device 18. This is not illustrated in detail, because its action is fully described in U. S. Patent No. 1,995,800. The piston rod 19 of the servo piston of the boost control device acts on the throttle valve 12 in the well known manner through the agency of a toggle linkage 20 connecting the throttle valve and the arm 21 of the three-armed lever 14. This arm 21 is also connected, by a link 22, to a cam 23, hereinafter referred to as the W. M. M. P. cam, which pivots about the centre 24 and the function of which is described below in greater detail. The letters W. M. M. P. are abbreviations for weakest mixture maximum power. The third arm 25 of the lever 14 is connected to the upper piston 26 of an accelerator pump 27 of the construction described in copending application Serial No. 550,830.

Fuel is fed to the induction pipe by an engine-driven fuel pump, not shown, along a pipe 28 terminating in an injection nozzle 29. The rate of flow of fuel through the pipe is varied by a metering valve 30 under the joint control of a servo mechanism and of the W. M. M. P. cam 23, as later described.

Figure 2:
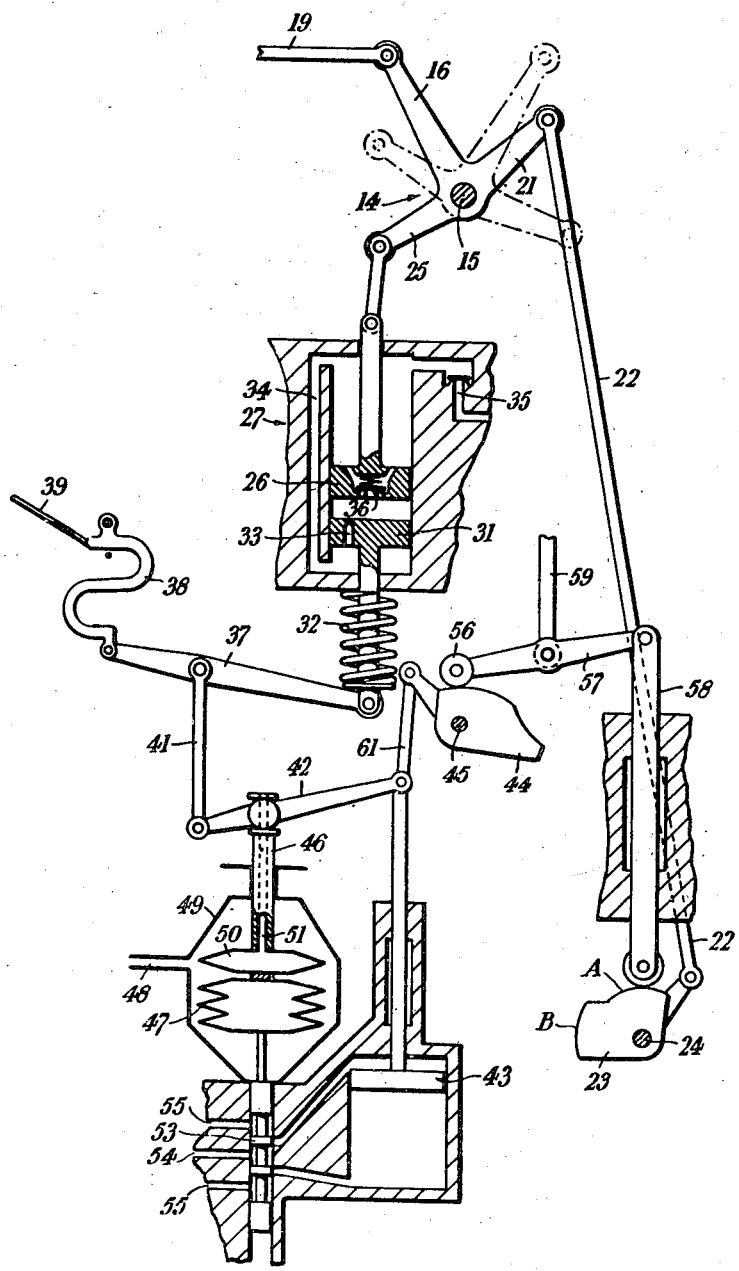
Fig. 2 is an enlarged view showing, also diagrammatically but in greater detail, the accelerator pump and the cams for effecting enrichment of the mixture at boosts beyond the cruising range.

The lower piston 31 of the accelerator pump is normally maintained by a spring 32 at the bottom of the pump cylinder and against a stop 131, and is formed with a restricted orifice 33 (see Fig. 2). A bye-pass conduit 34 connects the upper and lower ends of the pump cylinder, and a pipe 35 communicating with the top of the cylinder serves to maintain the latter full of liquid and to compensate for leakage losses.

The piston rod of the lower piston 31 is connected to the right-hand end of a lever 37, the other end of which is connected to a device for imposing a correction on the fuel supply for changes in induction temperature. This is constituted by a Bourdon tube 38 connected by a capillary tube 39 with a thermometer bulb 40 in the induction pipe 10 (see Fig. 1). The bulb 40 and tubes 38, 39 are filled with a liquid having a high coefficient of expansion.

The lever 37 is connected intermediate its ends, by a link 41, with the left-hand end of a lever 42. The other end of link lever 42 is connected to the piston rod of a servo piston 43, and via a link 61 to the arm 61' of a cam 44 which is rotatable about the centre 45. Intermediate its ends the lever 42 is pivoted to a rod 46 connected to an aneroid device, consisting of a stack of evacuated capsules 47 located in a chamber 49 exposed to boost pressure through a conduit 48, and a second capsule 50 exposed internally to exhaust back pressure through a conduit 51 communicating with the exhaust pipe 52 (see Fig. 1). The lower end of the double capsule stack 47, 50 is connected to a relay piston valve 53 of the double land type, controlling communication between the cylinder for the servo piston 43 and a pressure inlet 54 and exhaust outlets 55. As will readily be seen downward movement of the valve 53 results in upward movement of the servo piston 43 and upward movement of the valve 53 causes the piston 43 to move down, the lever 42 acting as a follow-up lever to restore the valve 53 to the neutral position. The position of the piston 43 in its cylinder, and therefore the setting of the cam 44 are thus determined by the boost pressure, the induction temperature and the exhaust back pressure. Downward movement of the piston 43 causes the cam 44 to rotate anti-clockwise to enrich the mixture as described below.

Against the cam 44 bears a roller 56 on one end of a floating lever 57 connected at the other end to a follower 58 which bears against the W. M. M. P. cam 23. The lever 57 is centrally connected to the metering valve 30 (Fig. 1) by a link 59. The cam 44 is so shaped that, as the servo piston 43 descends in its cylinder, the lever 57 will be rocked clockwise about its right-hand end, so lifting the valve 30 to increase the flow of fuel to the engine. A spring 159 (Fig. 1) holds follower 56 against cam 44 and follower 58 against cam 23.

The cam 44 is designed to give an economical mixture over the range of cruising boost, but a richer mixture at the higher boosts, the enrichment amounting to say 35% at take-off boost. When the pilot's lever 13 is in a position within the cruising range, roller 56 rests on portion CD of cam 44 which is substantially concentric. On movement of lever 13 beyond the upper limit of the cruising range, however, portion DE of the cam 44 is brought into operation to lift roller 56 and limb 59, and thus effect a progressive enrichment of the mixture as the pilot's lever 13 is moved on to the full throttle position. The W. M. M. P. cam 23 has a concentric portion A which gives a weak mixture at cruising boosts, but when the pilot's throttle lever is moved to a position calling for power, the raised portion B of this cam 23 comes beneath the lower end of the follower 58, thus rocking the floating lever 57 anti-clockwise about its left-hand end to enrich the mixture, the enrichment amounting to say 15% when the pilot's lever is in the full throttle position.

While, in the embodiments illustrated, the link 59 is caused to vary the fuel/air ratio by adjusting the area of the fuel metering orifice defined by the valve 30, it may as an alternative achieve this result by varying the effective stroke of the fuel pump as shown in copending application Serial No. 550,830.

What I claim as my invention and desire to secure by Letters Patent is:

1. In a fuel supply system for an aircraft engine, the combination with a throttle valve, of a pilot's throttle lever movable from a slow running position through a cruising range to a full throttle position, a variable datum boost control device for maintaining in the induction system a boost pressure corresponding to and selected by the position of said lever, means for supplying fuel and air to the engine, mixture control means for varying the fuel/air ratio of the mixture supplied to the engine, a servo mechanism responsive to boost pressure and operative in response to a change in the selected boost pressure to adjust said mixture control means to give an economical mixture at cruising boosts and a richer mixture for power when the boost pressure selected by said pilot's throttle lever exceeds a given limit, and a mechanism operated by movement of said lever and responsive solely to the position thereof for enriching the mixture on movement of said lever into a position to select a boost pressure in excess of said limit.

2. In a fuel supply system for an aircraft engine the combination with a throttle valve, of a pilot's throttle lever movable from a slow running position through a cruising range to a full throttle position, a variable datum boost control device for maintaining in the induction system a boost pressure corresponding to and selected by the position of said lever, means for supplying fuel and air to the engine, mixture control means for varying the fuel/air ratio of the mixture supplied to the engine, a servo mechanism responsive to boost pressure, a cam operated by said servo mechanism for adjusting the setting of the mixture control means in response to changes in boost pressure, said cam being shaped to provide an economical mixture at cruising boosts and a richer mixture when the boost pressure selected by said pilot's throttle lever exceeds a given limit, a second cam operating on said mixture control means, and a mechanical connection between said lever and said second cam for effecting progressive operation of said second cam on movement of said lever, said second cam being shaped to give an economical mixture for positions of said lever within the cruising range but a richer mixture on movement of said lever out of the cruising range and towards the full throttle position.

3. In a fuel supply system for an aircraft engine, a combination as claimed in claim 2, comprising a floating lever carrying at its ends followers cooperating respectively with the two cams and connected intermediate its ends to the mixture control means.

4. In a fuel supply system for an aircraft engine, the combination with a throttle valve, of a pilot's throttle lever movable from a slow running position through a cruising range to a full throttle position, a variable datum boost control device for maintaining in the induction system a boost pressure corresponding to and selected by the position of said lever, a conduit for supplying fuel under pressure to the engine, a metering orifice in said conduit, a valve for varying the area of said metering orifice, a servo mechanism responsive to boost pressure and operative in response to a change in the selected boost pressure to adjust said valve to give an economical mixture at cruising boosts and a richer mixture for power when the boost pressure selected by said pilot's throttle lever exceeds a given limit, and a mechanism operated by movement of said lever and responsive solely to the position thereof for adjusting said valve to enrich the mixture on movement of said lever into a position to select a boost pressure in excess of said limit.

5. In a fuel supply system for an aircraft engine, the combination with a throttle valve, of a pilot's throttle lever movable from a slow running position through a cruising range to a full throttle position, a variable datum boost control device for maintaining in the induction system a boost pressure corresponding to and selected by the position of said lever, a conduit for supplying fuel under pressure to the engine, a metering orifice in said conduit, a valve for varying the area of said metering orifice, a servo mechanism responsive to boost pressure, a cam operated by said servo mechanism for adjusting the setting of said valve in response to changes in boost pressure, said cam being shaped to provide an economical mixture at cruising boosts and a richer mixture when the boost pressure selected by said pilot's throttle lever exceeds a given limit, a second cam operating on said valve, and a mechanical connection between said lever and said second cam for effecting progressive operation of said second cam on movement of said lever, said second cam being shaped to give an economical mixture for positions of said lever within the cruising range but a richer mixture on movement of said lever out of the cruising range and towards the full throttle position.

6. In a fuel supply system for an aircraft engine, a combination as claimed in claim 2, wherein a total enrichment in mixture strength of about 50% is provided as the boost increases from said limit to maximum boost, an enrichment of about 35% being contributed by the cam associated with the servo mechanism and the remainder by the cam connected to the pilot's throttle lever.

EDWARD DODSON.

REFERENCES CITED

The following references are of record in the file of this patent:

UNITED STATES PATENTS

| Number | Name | Date |
|---|---|---|
| 2,031,527 | Dodson | Feb. 18, 1936 |
| 2,217,364 | Halford | Oct. 8, 1940 |
| 2,297,213 | Gooslau | Sept. 29, 1942 |
| 2,305,070 | Butler | Dec. 15, 1942 |

FOREIGN PATENTS

| Number | Country | Date |
|---|---|---|
| 523,895 | Great Britain | July 25, 1940 |
| 537,028 | Great Britain | June 5, 1941 |